United States Patent
Sandler et al.

(10) Patent No.: US 10,503,645 B1
(45) Date of Patent: Dec. 10, 2019

(54) DATA PROTECTION

(71) Applicant: Infinidat Ltd., Herzliya Pituach (IL)

(72) Inventors: Kariel Sandler, Bat Hefer (IL); Jacob Broido, Kfar Saba (IL)

(73) Assignee: INFINIDAT LTD., Herzliya (IL)

( * ) Notice: Subject to any disclaimer, the term of this patent is extended or adjusted under 35 U.S.C. 154(b) by 32 days.

(21) Appl. No.: 15/652,235

(22) Filed: Jul. 18, 2017

(51) Int. Cl.
  *G06F 12/08* (2016.01)
  *G06F 12/084* (2016.01)
  *G06F 12/0842* (2016.01)

(52) U.S. Cl.
  CPC ........ *G06F 12/084* (2013.01); *G06F 12/0842* (2013.01)

(58) Field of Classification Search
  CPC ............. G06F 12/0811; G06F 12/0806; G06F 12/0813; G06F 12/0815; G06F 13/1657; G06F 15/17375; G06F 2212/283; G06F 2212/621; G06F 12/0888
  See application file for complete search history.

(56) References Cited

U.S. PATENT DOCUMENTS 5,437,022 A * 7/1995 Beardsley ........... G06F 11/1666
                                                            711/120

* cited by examiner

*Primary Examiner* — Yong J Choe
(74) *Attorney, Agent, or Firm* — Reches Patents

(57) ABSTRACT

A method for providing fast access, the method may include obtaining, by a first storage controller of a storage system, retrieval information for retrieving, from a permanent storage space, a subset of cached data units, the subset of the cached data units forms a part of a set of cached data units that are cached in a first cache memory and were destaged to the permanent storage space; and retrieving, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

19 Claims, 8 Drawing Sheets

---

Obtaining, by a first storage controller of a storage system, retrieval information for retrieving, from a permanent memory layer, a subset of cached data units. The subset of the cached data units may form (only) a part of a set of cached data units that are cached in a first cache memory and were destaged to the permanent memory layer. 210

↓

Sensing or being notified about an occurrence of a failure to access the first cache memory. 220

↓

Retrieving, using the retrieval information, at least some of the cached data units of the subset from the permanent memory layer to a second cache memory. The second cache memory differs from the first cache memory. 230

---

Receiving, by the storage system, a request to read a data unit that is included in the at least some of the cached data units. 240

↓

First cache memory hit or miss ? 245 hit → Retrieving the data unit from the second cache memory. 250 miss → Reading the data units from the permanent storage space 255

200

DATA PROTECTION

BACKGROUND

Storage systems generally utilize large fast memories for caching data, so as to accelerate performance of I/O operations, e.g., shorten data access time and reduce latency of I/O operations. A cache memory stores data that is likely to be accessed, such as: most frequently accessed data, most recently accessed data, and data assumed to be accessed according to access patterns detected by prefetch algorithms.

SSD (solid-state drive) is a flash based device that is often used for caching data, due to its characteristics allowing fast access and large storage capacity.

Being a device that is separate from the controlling processor, the controlling processor may lose connection with the SSD, or the SSD itself may be subject to failures.

Though the loss of cached data, upon SSD failure, may not be considered as a critical failure, since the data is not really lost and can be read from the permanent devices—losing the option of fast access to the most frequency accessed data can dramatically degrade the I/O performance.

There is a need to maintain the system performance in the event of a cache memory failure or upon losing connection to the cache memory.

SUMMARY

There may be provided a method for data protection, the method may include obtaining, by a first storage controller of a storage system, retrieval information for retrieving, from a permanent storage space, a subset of cached data units, the subset of the cached data units forms a part of a set of cached data units that are cached in a first cache memory and were destaged to the permanent storage space; and retrieving, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

The method may include receiving, by the storage system, a request to read a data unit that is included in the at least some of the cached data units, and retrieving the data unit from the second cache memory.

The method may include initiating the retrieving of the at least some of the cached data units before receiving access requests by the first storage controller.

The method may include controlling the retrieving of the at least some of the cached data units based on (i) priorities of cached data units that belong to the subset, and (ii) priorities of cached data units that are stored in the second memory cache and do not belong to the subset.

The method may include selecting cached data units that belong to the subset based on priorities of the cached data units.

The method may include managing the first memory cache and the second memory cache by the first storage controller.

The method may include managing the second memory cache by the first storage controller, without managing the first memory cache by the first storage controller.

The method may include generating, by the first storage controller, another retrieval information for retrieving, from the permanent storage space, another subset of cached data units that is cached in the second cache memory and was destaged to the permanent storage space.

The method may include sending the additional retrieval information to another storage controller of the storage system.

The method may include selecting cached data units that belong to the subset, wherein the selecting is based on an estimate of which cached data units out of the set of cached data units will be associated with a majority of access requests aimed to the first cache memory.

There may be provided a non-transitory computer readable medium may store instructions that once executed by a storage controller of a storage system, cause the storage controller to execute the steps of obtaining retrieval information for retrieving, from a permanent storage space, a subset of cached data units, the subset of the cached data units forms a part of a set of cached data units that are cached in a first cache memory and were destaged to the permanent storage space; and retrieving, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

The non-transitory computer readable medium may store instructions for receiving, by the storage system, a request to read a data unit that is included in the at least some of the cached data units, and retrieving the data unit from the second cache memory.

The non-transitory computer readable medium may store instructions for initiating the retrieving of the at least some of the cached data units before receiving access requests by the first storage controller.

The non-transitory computer readable medium may store instructions for controlling the retrieving of the at least some of the cached data units based on (i) priorities of cached data units that belong to the subset, and (ii) priorities of cached data units that are stored in the second memory cache and do not belong to the subset.

The non-transitory computer readable medium may store instructions for selecting cached data units that belong to the subset based on priority of the cached data units.

The non-transitory computer readable medium may store instructions for managing the first memory cache and the second memory cache by the first storage controller.

The non-transitory computer readable medium may store instructions for managing the second memory cache by the first storage controller, without managing the first memory cache by the first storage controller.

The non-transitory computer readable medium may store instructions for generating, by the first storage controller, another retrieval information for retrieving, from the permanent storage space, another subset of cached data units that is cached in the second cache memory and was destaged to the permanent storage space.

The non-transitory computer readable medium may store instructions for sending the additional retrieval information to another storage controller of the storage system.

The non-transitory computer readable medium may store instructions for selecting cached data units that belong to the subset, wherein the selecting is based on an estimate of which cached data units out of the set of cached data units will be associated with a majority of access requests aimed to the first cache memory.

There may be provided a storage system may include a first storage controller, a first cache memory, a second cache memory unit and a permanent storage space, wherein the first storage controller is configured to (a) obtain retrieval information for retrieving, from a permanent storage space, a subset of cached data units, the subset of the cached data units forms a part of a set of cached data units that are cached in a first cache memory and were destaged to the permanent storage space; and (b) retrieve, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
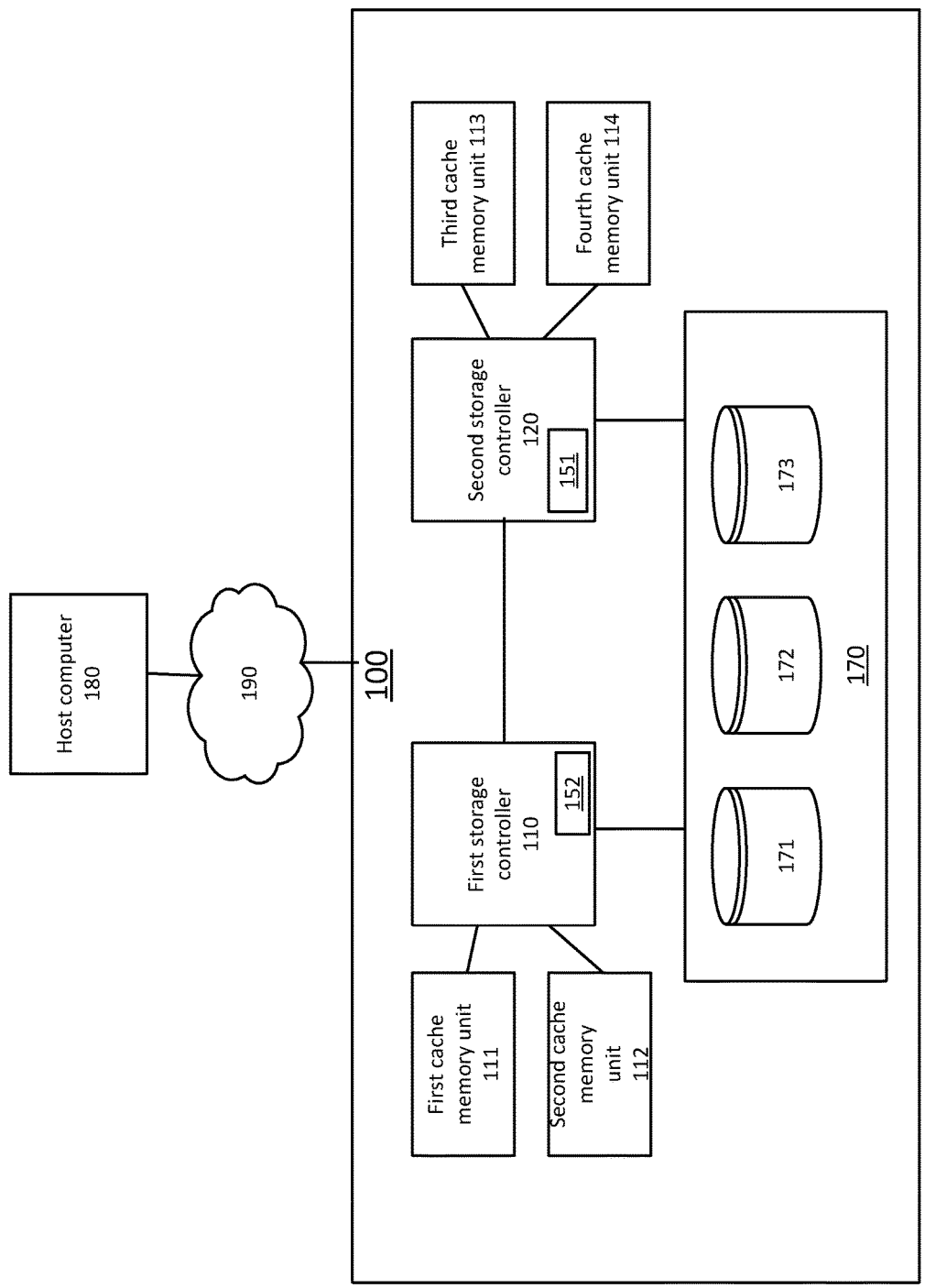
FIG. 1 illustrates an example of a storage system, a network and host computers.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

The following embodiments of the present invention facilitate maintaining high performance of responding to access requests, when one of the cache memories becomes inaccessible, by being able to promptly pre-fetch part of the data (a subset of cached data units) that was cached in the lost cache memory.

For simplicity of explanation it is assumed that the subset of cached data units is a top priority data. This is merely a non-limiting example.

Top priority data refers to data that is either: most frequently accessed, or expected to be accessed soon, or defined (e.g., by means of an SLA) as premium data that requires high access performance. In any case, it is assumed that caching top priority data significantly improves the system performance. The top priority data may compose a certain fraction of the total cached data. The certain fraction may be a minority of the entire cached data, e.g., 10-20% of the total cached data is defined as top priority data. It is noted that the entire cached data is prioritized over non-cached data, such as data that is stored only in slower storage devices, e.g., rotational drives, and that the top priority data is prioritized over cached data that is not defined as top priority data.

When the system loses one of its cache memory devices, it prefetches into another of the cache memory devices a portion of the data that was cached in the failed cache memory device and is considered as a top priority data. It is assumed that re-caching even a small portion of the previously cached data (if this small portion is defined as top priority data) can maintain the performance up to a sufficient level that does not drop sharply below the performance level experienced prior to the failure, in oppose to losing the entire data that was cached in the failed cache memory device (including the top priority data)—that can significantly degrade the performance.

The following examples may refer to cached data that is non-dirty data and is cached for the purpose of fast reading, since other mechanisms may be used for backing up dirty data.

FIG. 1 illustrates a storage system 100 that includes one or more storage controllers, such as first storage controller 110 and second storage controller 120. The number of storage controllers may exceed two. Storage controllers 110 and 120 may be clustered servers, computers or any other processors that communicate with each other for providing storage access services.

Each storage controller may control one or more cache memory units. The number of cache memory units that are controlled by a single storage controller may be one, two or more.

First and second cache memory units 111 and 112 are coupled to first storage controller 110 and are controlled by first storage controller 110.

Third and fourth cache memory units 113 and 114 are coupled to second storage controller 120 and are controlled by second storage controller 120.

First and second storage controllers 110, 120 are coupled to a permanent storage space 170 that includes one or more storage devices, such as disk drives 171, 172 and 173. Permanent may mean long-term storage—for example a storage period that may one or more weeks, one or more months, one or more years, and the like.

Each cache memory unit 111, 112, 113 and 114 may be a non-volatile fast accessed storage device, e.g., SSD, that is capable of storing a large amount of data (1 Terabyte or more).

One or more host computers, such as host computer 180, is coupled to storage system 100 via a communication network 190, and transmits read and write access requests towards storage system 100. Access requests received from host computers are handled by either first or second storage controller 110 or 120.

Data received as part of write requests is temporarily stored in one of the cache memory units and destaged later from the cache memory unit to the permanent storage space. Before being destaged, the data stored in the cache memory unit is called 'dirty data'.

Serving read requests involves reading the requested data from the permanent storage space to one of the cache memory units, before being transmitted to the host computer, or—if the requested data is already in one of the cache memory units, the data will be served from the cache memory unit, without needing to access a permanent storage device.

Part of the data stored in the permanent storage space, may be cached in one of the cache memory units. The cached data that is most likely to be requested by the host, and may be a most frequently accessed data, or data defined as premium data, or prefetched data, which is data that the controller determines that it is likely to be requested soon by the host and therefore the data is prefetched from the permanent storage space to the cache memory units.

Top priority data may form a limited portion of the entire cached data, e.g., 5%, 10% or 20% of the entire cached data or the entire clean cached data.

A failure of a cache memory unit may cause significant performance degradation, because all the cached data units that were cached in the failed cache memory unit are not accessible (within any other cache memory unit) and the corresponding data units will be required to be read from the slower permanent storage device.

A similar performance degradation will occur when one of the storage controllers is failed, e.g., first storage controller 110. Though, another storage controller, e.g., second storage controller 120, will take over all the responsibilities of the failed first storage controller 110, the second storage controller 120 may not have access to first and second cache memory units 111 and 112 that are accessible only by the failed first storage controller 110.

According to embodiments of the present invention, in order to avoid the performance degradation described above, each storage controller is responsible for enabling establishment and maintenance of a safe repository of retrieval information associated with the top priority cached data. The retrieval information facilitates restoring top priority cached data into the cache when the cache memory unit that used to store the top priority cached data becomes unavailable, due to any circumstances where the cache memory unit becomes inaccessible, for example: due to cache memory unit failure, or due to failure of the storage controller that manages the cache memory unit.

The retrieval information may include information indicative of the location within the permanent storage space and the size of any data unit that is considered part of the top priority cached data. For example, the location may be a physical address within a storage device or a virtual address within a virtual address space (e.g., a volume) that is translated into a physical location. Alternatively, the top priority cached data may be duplicated and the duplicate data may be stored in another fast access memory and in another form (e.g., compressed, without caching metadata) and the retrieval information may include: a pointer to the duplicate data and information required to enqueue the data back in the cache, and may optionally include the compressed or uncompressed duplicate data.

According to an embodiment of the invention, each of the storage controllers hands over to at least one other storage controller retrieval information of top priority cached data that is currently stored in the cache memory units that are under the control of the storage controller.

First storage controller 110 hands over to second storage controller 120 first retrieval information of top priority cached data that is cached in either first or second cache memory unit 111 and 112.

In the storage system of FIG. 1 the first retrieval information 151 enables a retrieval of top priority cached data units that are stored in either one of first and second cache memory units 111 and 112.

In the storage system of FIG. 1 the second retrieval information 152 enables a retrieval of top priority cached data units that are stored in either one of third and fourth cache memory units 113 and 114.

Second storage controller 120 stores the first retrieval information 151 in one or more cache memory unit, or at another memory unit (not shown). FIG. 1 illustrates the first retrieval information 151 as being stored in an internal memory of the second storage controller 110.

First storage controller 110 is responsible for keeping the first retrieval information updated at second storage controller 120, so it may keep sending to second storage controller 120 updates or notifications regarding the first retrieval information, for example: requests to delete first retrieval information records of data units whose priority has been declined below a threshold that defines a top priority cached data; requests to add first retrieval information records of data units that enter the category of top priority cached data, after exceeding the threshold that defines top priority cached data; and requests to update first retrieval information records of current top priority cached data (when their location or size is changed).

The same applies to the second storage controller 120.

Second storage controller 120 hands over to first storage controller 110 second retrieval information of top priority cached data that is cached in either third or fourth cache memory unit 113 and 114.

First storage controller 110 stores the second retrieval information 152 in one or more cache memory units, or at another memory unit (not shown).

FIG. 1 illustrates the second retrieval information 152 as being stored in an internal memory of the first storage controller 110.

Second storage controller 120 is responsible for keeping the second retrieval information updated at first storage controller 110, so it may keep sending to first storage controller 110 updates or notifications regarding the second retrieval information, for example: requests to delete second retrieval information records of data units whose priority has been declined below a threshold that defines a top priority cached data; requests to add second retrieval information records of data units that enter the category of top priority cached data, after exceeding the threshold that defines top priority cached data; and requests to update second retrieval information records of current top priority cached data (when their location or size is changed).

Each cached data unit is scored for its cache priority. The cache priority score may be indicative of the chance of receiving access requests for the data unit in a certain time window, and/or may be indicative of the popularity of the data and/or may be indicative of the performance requirement for the data unit. The cache priority score for each data unit is determined when the data unit enters the cache memory and may also be kept updated while the data unit is cached, according to current access patterns towards the data unit.

The threshold that defines top priority cached data units may be a certain cache priority score, where cached data units having a higher cache priority score are considered as top priority cached data unit. Alternatively, the threshold of top priority cached data unit may define a certain percentage of the cached data unit, e.g., 10%, and only the top scored data units, e.g., the 10% top scored data units are considered as top priority data.

According to an embodiment where a storage controller, e.g., first storage controller 110, becomes unavailable to the host computers that access the storage system, either because of a failure of first storage controller 110 or due to communication problems between the host computer and first storage controller 110—second storage controller 120, which will take the responsibilities of first storage controller 110 from now on, prefetches the data units whose first retrieval information records were reported by first storage controller 110 prior to the failure.

The data units are read from the physical storage space into one of the third or fourth cache memory unit 113 or 114. It is noted that the data units are read into the cache memory unit regardless of access requests received from the host computer and even before receiving any access requests from the host directed to these data units. These data units are read into the cache memory unit since it is assumed that these data units are most likely to be read soon. Thus, when read requests are received from the host computer for reading a data unit that was defined by the failed storage controller 110 as top priority cached data unit, the data unit can be read from the cache of storage controller 120, rather than required to be read from the slower physical storage space.

According to another embodiment of the present invention, each storage controller (or the only storage controller that may exist in the storage system), maintains its own retrieval information within a memory other than the cache memory units, so that the retrieval information can be used for reconstructing top priority data into a first cache memory unit upon a failure of a second cache memory unit.

Figure 2:
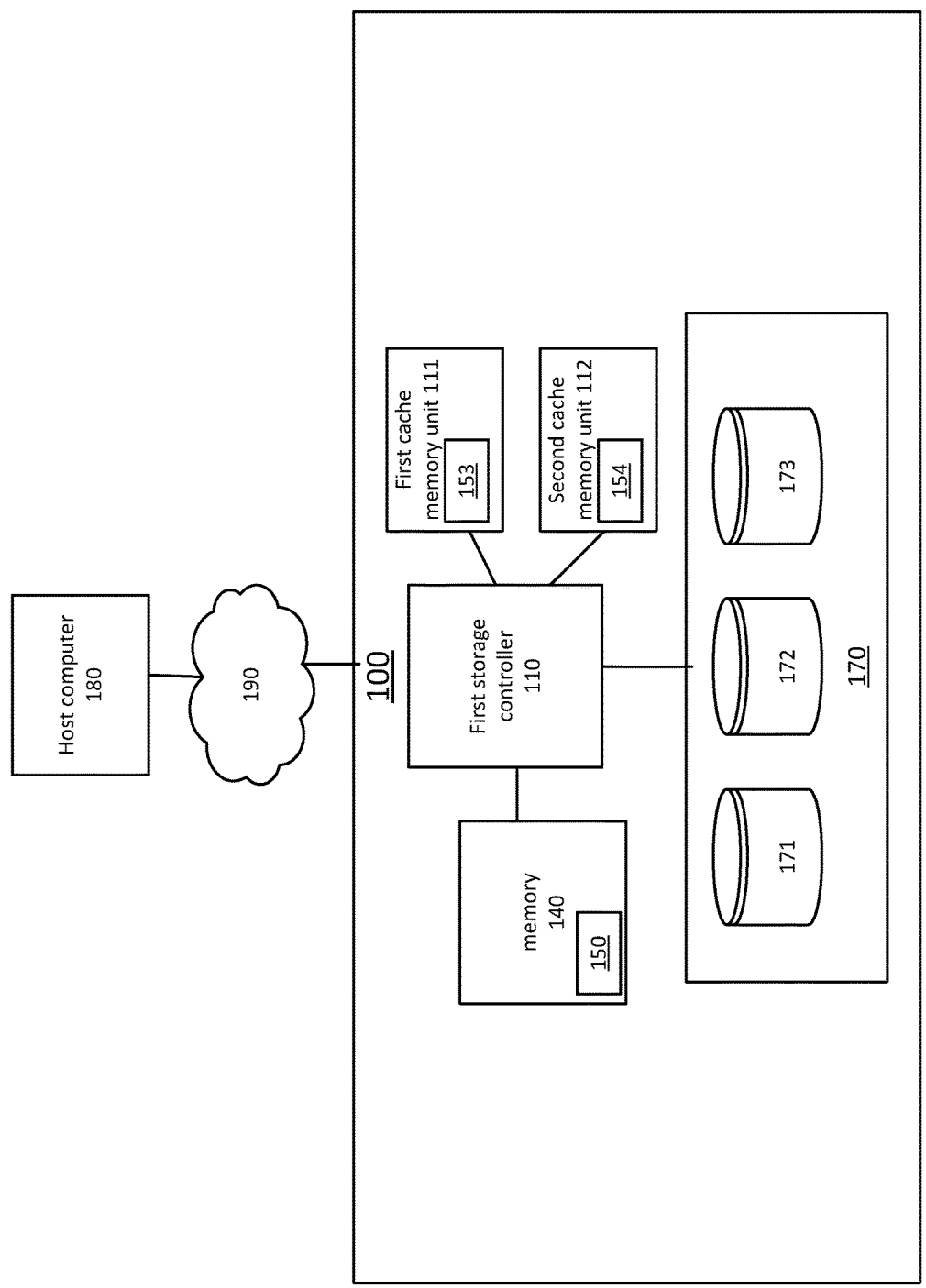
FIG. 2 illustrates an example of a storage system, a network and host computers.

FIG. 2 illustrates a storage system that includes a single storage controller—first storage controller 110 that is coupled to first and second cache memory units 111 and 112. First storage controller 110 may utilize another memory 140 that is different from the cache memory units for storing the retrieval information 150 of top priority cached data unit that is cached in first and second cache memory units 111 and 112.

Additionally or alternatively, second cache memory unit 112 may store first cache memory retrieval information 154 of top priority cached data units that are cached in first cache memory unit 111. First cache memory unit 111 may store second cache memory unit retrieval information 153 of top priority cached data units that are cached in second cache memory unit 112.

When one of the first and second cache memory units 111 or 112 fails, the first storage controller 110 may retrieve either one of retrieval information 150, 153 and 153 (depending on the failed cache memory unit) related to cached data units that were cached in the failed cache memory unit and prefetches, by using the retrieval information, the corresponding data units into an operational cache memory unit.

Prefetching top priority data may involve evicting less important data from the cache, in case the cache memory unit is full.

Figure 3:
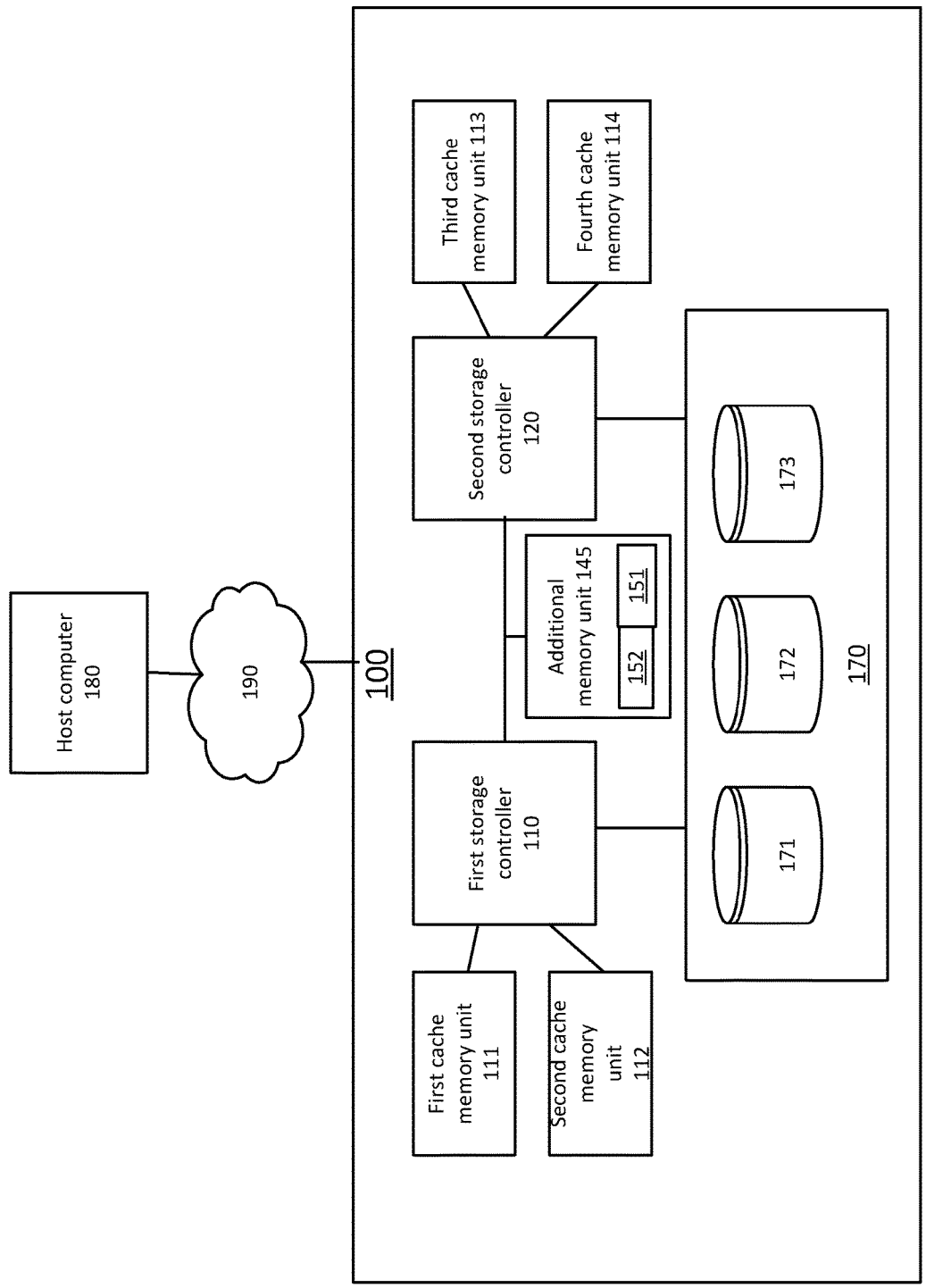
FIG. 3 illustrates an example of a storage system, a network and host computers.

FIG. 3 illustrates a storage system that differs from the storage system of FIG. 1 by including an additional memory unit 145 that differs from first to fourth cache memory units 111-114.

The additional memory unit 145 is shared by first and second storage controllers 110 and 120. The additional memory unit 145 stores the first and second retrieval information 151 and 152.

Multiple additional memory units may be provided for redundancy—and may be accessed by first and second storage controllers.

Figure 4:
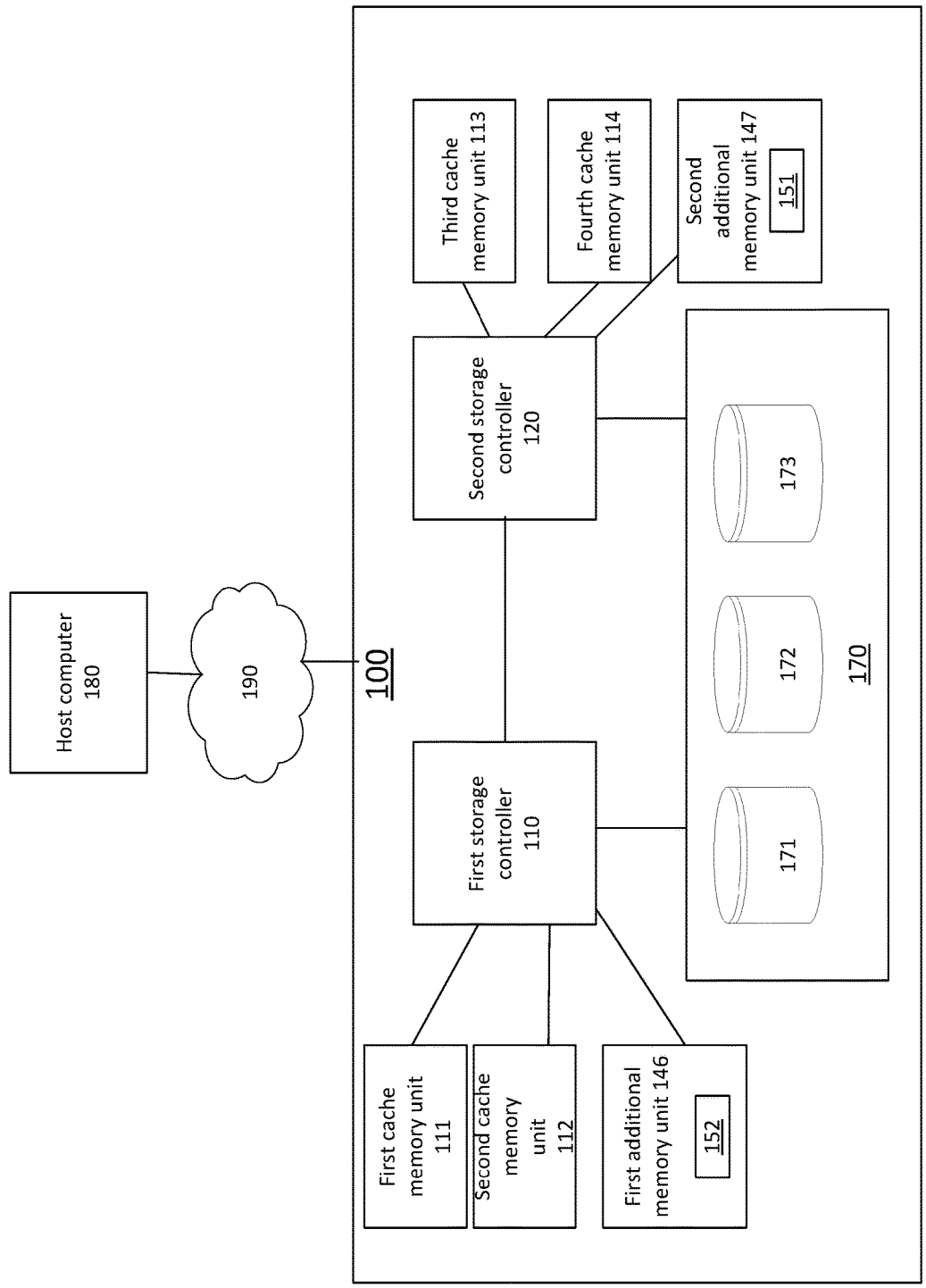
FIG. 4 illustrates an example of a storage system, a network and host computers.

FIG. 4 illustrates a storage system that differs from the storage system of FIG. 1 by including a first additional memory unit 146 and a second additional memory unit 147—both differ from first to fourth cache memory units 111-114.

The first storage controller 110 controls the first additional memory unit 146 that stores the second retrieval information 152. The second storage controller 120 controls the second additional memory unit 147 that stores the first retrieval information 151.

Figure 5:
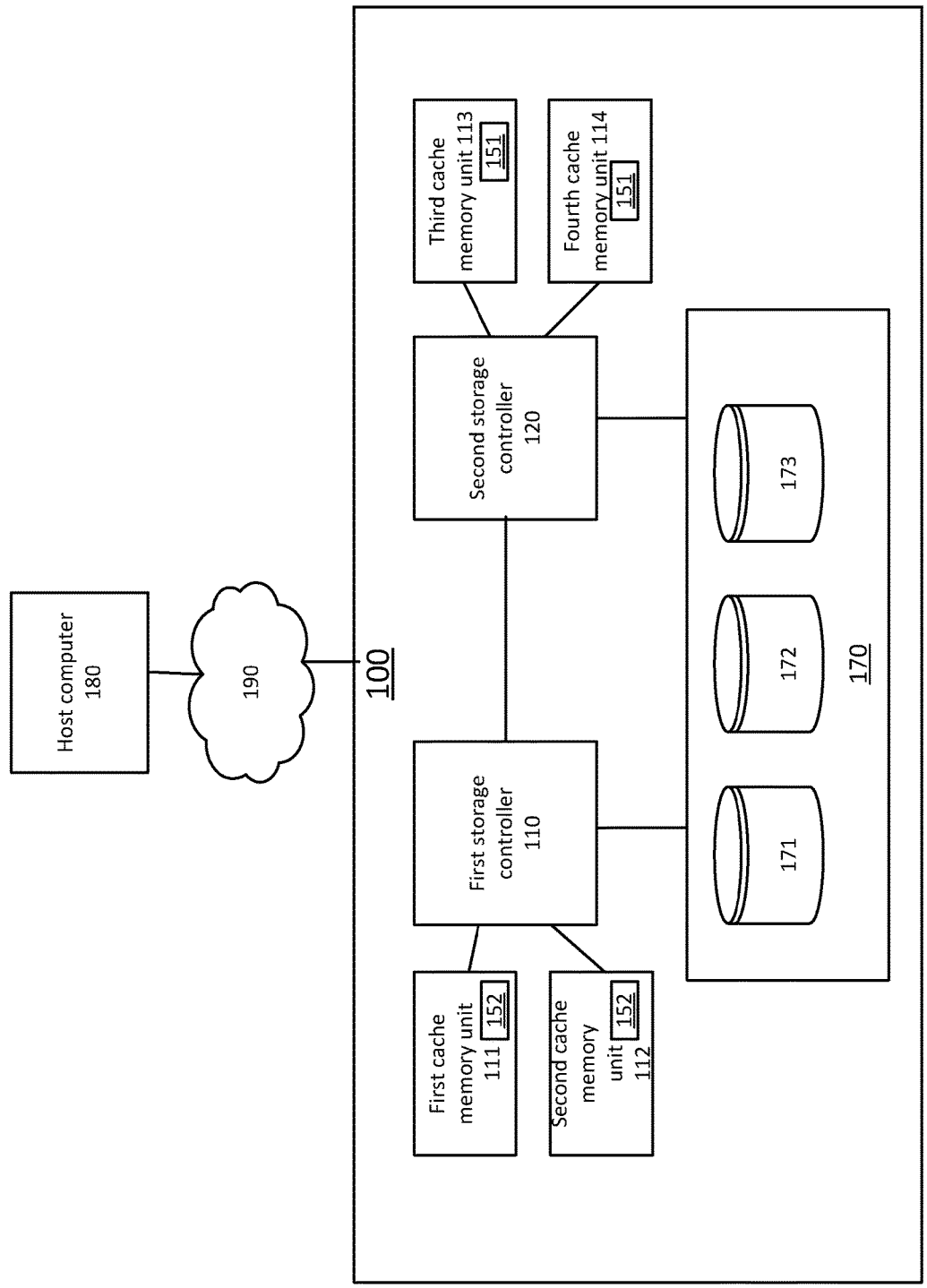
FIG. 5 illustrates an example of a storage system, a network and host computers.

FIG. 5 illustrates a storage system that differs from the storage system of FIG. 1 by storing the second retrieval information 152 in each one of the first and second cache memory units 111 and 112 and by storing the first retrieval information 151 in each one of the third and fourth cache memory unit 113 and 114.

Figure 6:
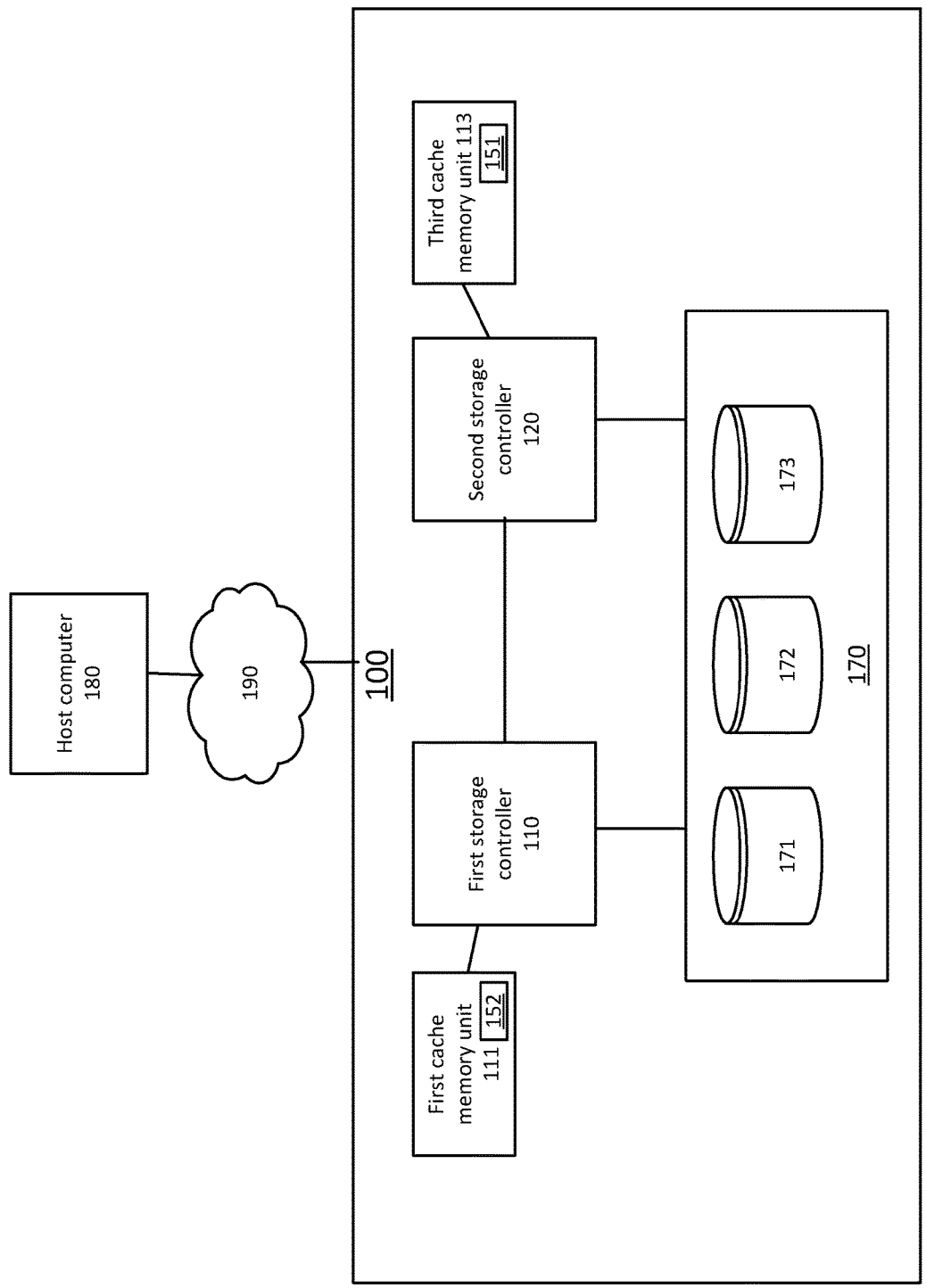
FIG. 6 illustrates an example of a storage system, a network and host computers.

FIG. 6 illustrates a storage system that differs from the storage system of FIG. 1 by having only a single cache memory unit per storage controller and by storing the first retrieval information 151 in the third cache memory unit 113, and by storing the second retrieval information 152 in the first cache memory units 111.

In the storage system of FIG. 6 the first retrieval information 151 enables a retrieval of top priority cached data units that are stored in first cache memory unit 111.

In the storage system of FIG. 6 the second retrieval information 152 enables a retrieval of top priority cached data units that are stored in third cache memory unit.

Figure 7:
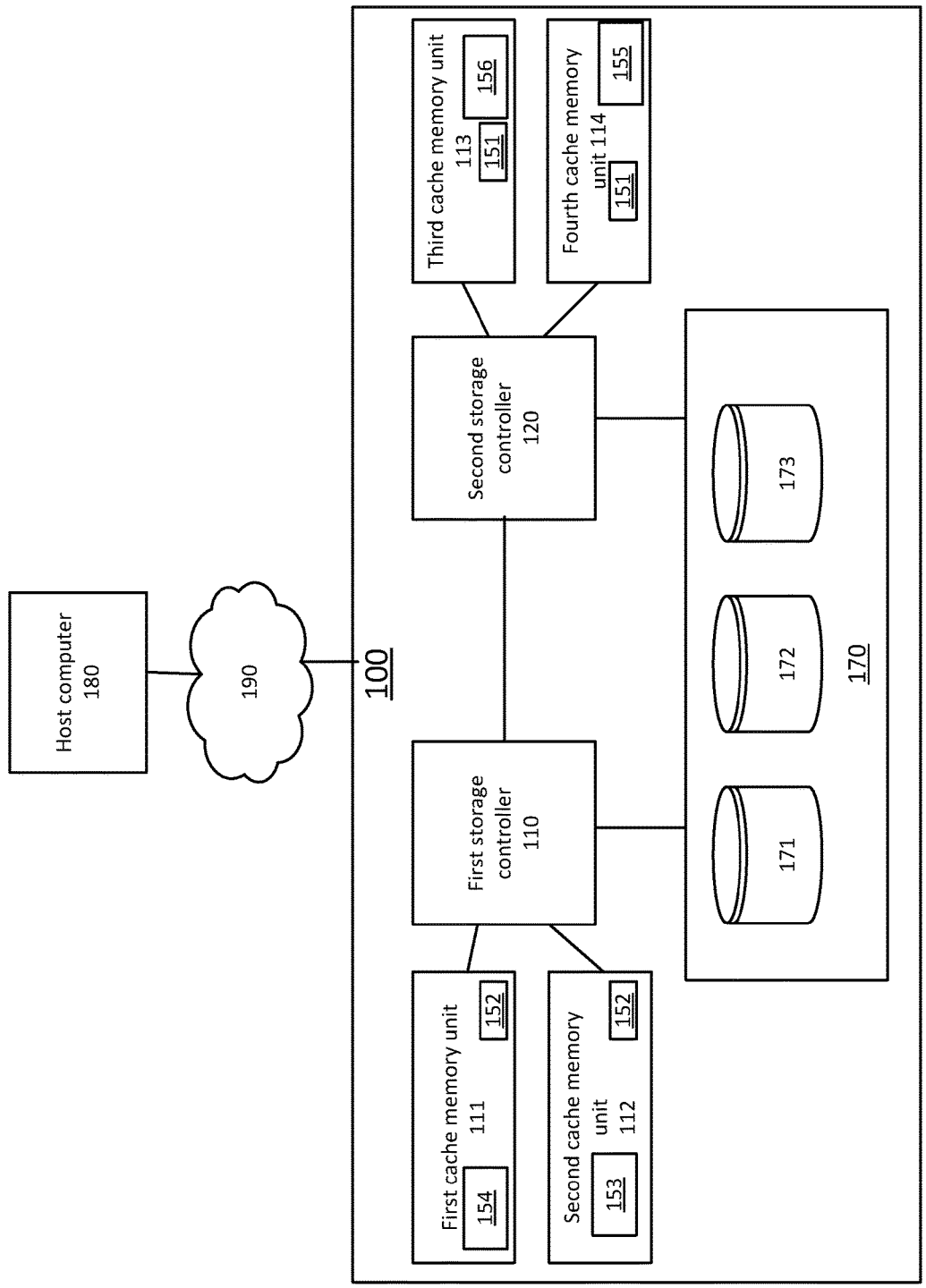
FIG. 7 illustrates an example of a storage system, a network and host computers.

FIG. 7 illustrates a storage system in which the first storage controller 110 controls first and second cache memory units 111 and 112 and the second storage controller 120 controls third and fourth cache memory units 113 and 114. First retrieval information 151 enables a retrieval of top priority cached data units that are stored in either one of first and second cache memory units 111 and 112. The second retrieval information 152 enables a retrieval of top priority cached data units that are stored in either one of third and fourth cache memory units 113 and 114.

FIG. 7 illustrates a storage system that differs from the storage system of FIG. 1 by:
a. Storing the second retrieval information 152 in each one of the first and second cache memory units 111 and 112.
b. Storing the first retrieval information 151 in each one of the third and fourth cache memory units 113 and 114.
c. Storing first cache memory retrieval information 153 in second cache memory unit 112.
d. Storing second cache memory unit retrieval information 154 in first cache memory unit 111.
e. Storing third cache memory retrieval information 155 in fourth cache memory unit 114.
f. Storing fourth cache memory unit retrieval information 156 in third cache memory unit 113.

First, second, third and fourth cache memory retrieval information facilitates a retrieval of top priority cached data units that are stored in first cache memory unit 111, second cache memory unit 112, third cache memory unit 113 and fourth cache memory unit, respectively.

Figure 8:
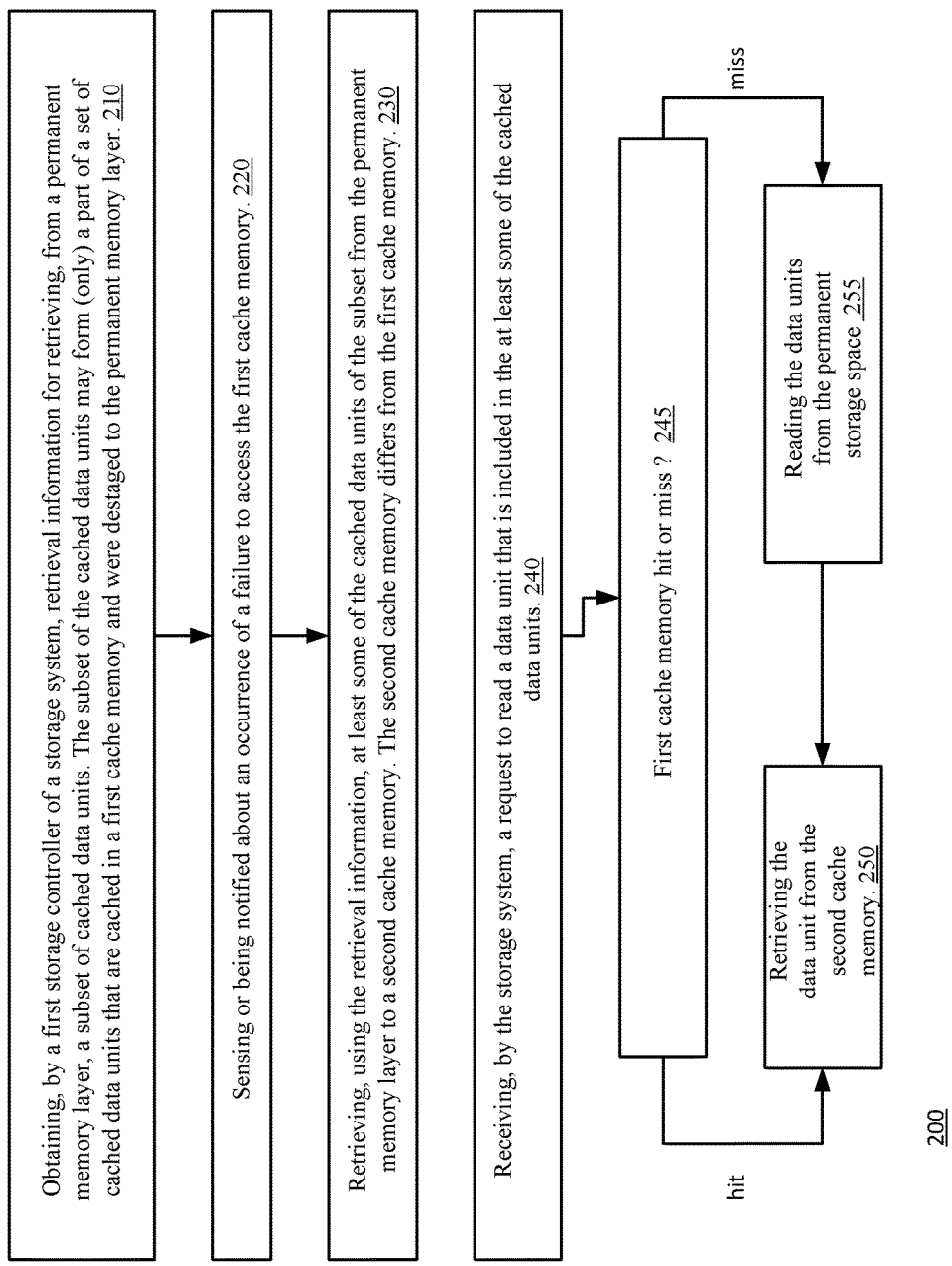
FIG. 8 illustrates an example of a method.

FIG. 8 illustrates method 200 for providing data protection. The method provides fast access. The access is fast in the sense that it involves receiving from a host computer a read request and responding to the read request by providing one or more cached data units that were previously (before the read request) destaged from the permanent storage layer).

The fast access is maintained even in the case of an inaccessible cache memory, due to prefetching a portion of cached data was stored in the failed cache memory into another cache memory.

Method 200 may start by step 210 of obtaining, by a first storage controller of a storage system, retrieval information for retrieving, from a permanent storage space, a subset of cached data units.

The subset of the cached data units may form (only) a part of a set of cached data units that are cached in a first cache memory and were destaged to the permanent storage space prior to the start of step 210.

Step 210 may include receiving the retrieval information and/or receiving from another entity (for example another storage controller) the retrieval information, as illustrated by FIGS. 1, 4, 5, 6. Step 210 may include generating the retrieval information by the first storage controller, as illustrated in FIG. 2. Some of the retrieval information may be received and some retrieval information may be generated. The retrieval information may be generated by another storage controller and received by the first storage controller, and/or may be generated by the first storage controller and sent to another storage controller.

Step 210 may include selecting the cached data units that will belong to the subset. Any criterion may be used, for example the criterion may be priorities of the cached data units, and the selected cached data units that will belong to the subset may be top priority data units.

For example—step 210 may include a selecting that is based on an estimate of which cached data units out of the set of cached data units will be associated with a majority of access requests aimed to the first cache memory. The estimate may be based on previous access patterns directed to cached data units, predefined priorities of the data units and the like.

Step 210 may be followed by step 220 of sensing or being notified about an occurrence of a failure to access the first cache memory.

Step 220 may be followed by step 230 of retrieving, using the retrieval information, at least some of the cached data units of the subset from the permanent storage space to a second cache memory. The second cache memory differs from the first cache memory, e.g., the first and second cache memories may be two distinct devices or may be housed in two distinct devices.

Step 230 may include evicting second data units (data units that were already stored in second cache memory when step 230 started) from the second cache memory in order to free space for caching the at least some of the cached data units of the subset.

Step 230 may be executed until all the cached data units of the subset are retrieved. It is noted that one or more cached data units of the subset may not retrieved—for example when the controller coupled to the second cache memory prefers continuing storing (or avoiding eviction of) some cached data units of the second cache memory over adding the one or more cached data units of the subset to the second cache memory.

Step 230 may be initiated even before (and/or regardless) a receiving of access requests by the first storage controller, and particularity, access requests from a host computer that are directed to data units included in the at least some of the cached data units of the subset.

Method 200 may also include step 240 of receiving, by the storage system, a request to read a data unit that is included in the at least some of the cached data units.

Step 240 may be followed by step 245 of checking whether there is a cache hit or miss.

If there is a hit—step 245 is followed by step 250 of retrieving the data unit from the second cache memory.

If there is a miss—step 240 is followed by step 255 of reading the data units from the permanent storage space.

Step 255 may be followed by step 250.

Step 230 may include at least one of the following:
a. Controlling the retrieving of the at least some of the cached data units based on (i) priorities of cached data units that belong to the subset, and (ii) priorities of cached data units that are stored in the second memory cache and do not belong to the subset. For example—when a cached data unit of the second memory unit (that does not belong to the subset) should be evicted in order to write a cached data unit of the subset (that is not yet cached in the second cache memory unit)—than step 230 may apply any policy for determining whether to write the cached data unit of the subset. For example—higher priority cached data unit wins.
b. Controlling the retrieving of the at least some of the cached data units based on maximal number per time period applied on the writing of cached data units of the subset.

Steps 210 and 230 may be repeated for more than a single subset of cached data units. For example—step 210 may include obtaining by the first storage controller, another retrieval information for retrieving, from the permanent storage space, another subset of cached data units that is cached in the second cache memory and was destaged to the permanent storage space. Step 210 may also include sending the additional retrieval information to another storage controller of the storage system. The other storage controller may be, for example, the second storage controller of FIGS. 1-7 or yet another storage controller (not shown).

Method 200 may include managing the first memory cache and the second memory cache by the first storage controller. Alternatively, method 200 may include managing the second memory cache by the first storage controller, without managing the first memory cache by the first storage controller.

Although method 200 is illustrated in relation to the first storage controller it should be noted that the method may be executed, mutatis mutandis, by the second storage controller.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

more, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for data protection, the method comprises:
   obtaining, by a first storage controller of a storage system, retrieval information for retrieving, from a permanent storage space, a subset of cached data units, the subset of the cached data units forms a part of a set of cached data units that are cached in a first cache memory and were destaged to the permanent storage space;
   selecting cached data units that belong to the subset, wherein the selecting is based on an estimate of which cached data units out of the set of cached data units are associated with a majority of access requests aimed to the first cache memory;
   and
   retrieving, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

2. The method according to claim 1, comprising receiving, by the storage system, a request to read a data unit that is included in the at least some of the cached data units, and retrieving the data unit from the second cache memory.

3. The method according to claim 1, comprising initiating the retrieving of the at least some of the cached data units before receiving access requests by the first storage controller.

4. The method according to claim 1, comprising controlling the retrieving of the at least some of the cached data units based on (i) priorities of cached data units that belong to the subset, and (ii) priorities of cached data units that are stored in the second memory cache and do not belong to the subset.

5. The method according to claim 1, comprising selecting cached data units that belong to the subset based on priorities of the cached data units.

6. The method according to claim 1, comprising managing the first memory cache and the second memory cache by the first storage controller.

7. The method according to claim 1, comprising managing the second memory cache by the first storage controller, without managing the first memory cache by the first storage controller.

8. The method according to claim 1, comprising generating, by the first storage controller, another retrieval information for retrieving, from the permanent storage space, another subset of cached data units that is cached in the second cache memory and was destaged to the permanent storage space.

9. The method according to claim 8, comprising sending the additional retrieval information to another storage controller of the storage system.

10. A non-transitory computer readable medium that stores instructions that once executed by a storage controller of a storage system, cause the storage controller to execute the steps of:
    obtaining retrieval information for retrieving, from a permanent storage space, a subset of cached data units, the subset of the cached data units forms a part of a set of cached data units that are cached in a first cache memory and were destaged to the permanent storage space;
    selecting cached data units that belong to the subset, wherein the selecting is based on an estimate of which cached data units out of the set of cached data units are associated with a majority of access requests aimed to the first cache memory;
    and
    retrieving, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

11. The non-transitory computer readable medium according to claim 10, that stores instructions for receiving, by the storage system, a request to read a data unit that is included in the at least some of the cached data units, and retrieving the data unit from the second cache memory.

12. The non-transitory computer readable medium according to claim 10, that stores instructions for initiating the retrieving of the at least some of the cached data units before receiving access requests by the first storage controller.

13. The non-transitory computer readable medium according to claim 10, that stores instructions for controlling the retrieving of the at least some of the cached data units based on (i) priorities of cached data units that belong to the subset, and (ii) priorities of cached data units that are stored in the second memory cache and do not belong to the subset.

14. The non-transitory computer readable medium according to claim 10, that stores instructions for selecting cached data units that belong to the subset based on priority of the cached data units.

15. The non-transitory computer readable medium according to claim 10, that stores instructions for managing the first memory cache and the second memory cache by the first storage controller.

16. The non-transitory computer readable medium according to claim 10, that stores instructions for managing the second memory cache by the first storage controller, without managing the first memory cache by the first storage controller.

17. The non-transitory computer readable medium according to claim 10, that stores instructions for generating, by the first storage controller, another retrieval information for retrieving, from the permanent storage space, another subset of cached data units that is cached in the second cache memory and was destaged to the permanent storage space.

18. The non-transitory computer readable medium according to claim 17, that stores instructions for sending the additional retrieval information to another storage controller of the storage system.

19. A storage system comprising a first storage controller, a first cache memory, a second cache memory unit and a permanent storage space, wherein the first storage controller is configured to (a) obtain retrieval information for retrieving, from a permanent storage space, a subset of cached data units, the subset of the cached data units forms a part of a set of cached data units that are cached in a first cache memory and were destaged to the permanent storage space; (b) select cached data units that belong to the subset, based on an estimate of which cached data units out of the set of cached data units are associated with a majority of access requests aimed to the first cache memory; and (c) retrieve, using the retrieval information, at least some of the cached data units of the subset from the permanent storage space to a second cache memory, wherein the retrieving occurs in response to an occurrence of a failure to access the first cache memory; wherein the second cache memory differs from the first cache memory.

* * * * *